United States Patent
Liu et al.

(10) Patent No.: US 11,714,249 B2
(45) Date of Patent: Aug. 1, 2023

(54) FIXING STRUCTURE AND PROJECTION APPARATUS USING THE SAME

(71) Applicant: Coretronic Corporation, Hsin-Chu (TW)

(72) Inventors: Ming-Chen Liu, Hsin-Chu (TW); Hung-Lin Lee, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/553,661

(22) Filed: Dec. 16, 2021

(65) Prior Publication Data
US 2022/0221679 A1   Jul. 14, 2022

(30) Foreign Application Priority Data

Jan. 12, 2021 (CN) .......................... 202120065420.3

(51) Int. Cl.
*G02B 7/02* (2021.01)
*G03B 21/20* (2006.01)

(52) U.S. Cl.
CPC ............... *G02B 7/02* (2013.01); *G03B 21/20* (2013.01)

(58) Field of Classification Search
CPC ........ G03B 21/14; G03B 21/20; G03B 21/28; G03B 21/145; G03B 21/208; G03B 21/2053; G02B 7/00; G02B 7/003; G02B 7/004; G02B 7/02; H04N 9/315; H04N 9/3141; H04N 9/3152
See application file for complete search history.

(56) References Cited

U.S. PATENT DOCUMENTS

| | | | | |
|---|---|---|---|---|
| 5,680,260 A | * | 10/1997 | Farcella | G02B 7/022 359/818 |
| 2012/0242966 A1 | * | 9/2012 | Saito | G03B 21/145 353/100 |
| 2013/0021807 A1 | * | 1/2013 | Saruwatari | G03B 21/145 362/399 |
| 2017/0227838 A1 | * | 8/2017 | Saegusa | G03B 21/208 |
| 2019/0094565 A1 | * | 3/2019 | Park | G02B 13/001 |
| 2019/0094676 A1 | * | 3/2019 | Jobi | G03B 21/145 |

FOREIGN PATENT DOCUMENTS

| | | |
|---|---|---|
| CN | 111338163 | 6/2020 |
| TW | I418917 | 12/2013 |

* cited by examiner

*Primary Examiner* — Sultan Chowdhury
(74) *Attorney, Agent, or Firm* — JCIPRNET

(57) ABSTRACT

The invention provides a fixing structure having an inner wall forming a through hole around a central axis and a first rib protruded from the inner wall toward the central axis along a radial direction of the through hole with an extending direction parallel to an axial direction of the central axis, and a projection apparatus including an illumination system, a light valve, and a projection lens. The illumination system includes the fixing structure, an optical device, and a light source illuminating the optical device to form an illumination beam. The optical device is placed in the through hole and interfered by the first rib to be fixed in the through hole. The light valve is located on a transmission path of the illumination beam and converts it into an image beam. The projection lens is located on a transmission path of the image beam and projects the image beam.

20 Claims, 7 Drawing Sheets

FIXING STRUCTURE AND PROJECTION APPARATUS USING THE SAME

CROSS-REFERENCE TO RELATED APPLICATION

This application claims the priority benefit of China application serial no. 202120065420.3, filed on Jan. 12, 2021. The entirety of the above-mentioned patent application is hereby incorporated by reference herein and made a part of this specification.

BACKGROUND OF THE INVENTION

Field of the Invention

The invention relates to a fixing structure and a projection apparatus, and more particularly to a fixing structure capable of fixing an optical device and a projection apparatus using the fixing structure.

Description of Related Art

Common optical devices, such as lenses, may be fixed in an optical machine of a projector in the following ways.

One way is to dispense an adhesive on the adhesive groove of the lens carrier to fix the lens.

Another way is to first assemble the lens on the engine base of the optical machine, and then dispense an adhesive on the adhesive groove on the base to fix the lens.

Another method is to first assemble the lens with the lens carrier and the cover, and then fix the lens on the engine base of the optical machine by screwing.

From the above, it may be seen that there are many ways to fix the lens. However, using the above methods to fix the lens on a smaller-sized projection product increases the overall size of the product or increases the difficulty of the operation.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a fixing structure that is simple in structure and may reduce the use of parts.

The invention provides a projection apparatus that may simplify parts and manufacturing processes at the same time.

Other objects and advantages of the invention may be further understood from the technical features disclosed in the invention.

In order to achieve one or part or all of the above objects or other objects, an embodiment of the invention provides a fixing structure configured to fix an optical device. The fixing structure has an inner wall and a first rib. The inner wall forms a through hole around a central axis. The first rib is disposed at the inner wall and protruded from the inner wall toward the central axis along a radial direction of the through hole. An extending direction of the first rib is parallel to the central axis. When the optical device is placed in the through hole, the first rib interferes with the optical device so that the optical device is fixed in the through hole.

In order to achieve one or part or all of the above objects or other objects, an embodiment of the invention provides a projection apparatus including an illumination system, a light valve, and a projection lens. The illumination system is configured to provide an illumination beam, and the illumination system includes a light source, a fixing structure, and an optical device. The fixing structure has an inner wall and a first rib. The inner wall forms a through hole around a central axis. The first rib is disposed at the inner wall, and the first rib is protruded from the inner wall toward the central axis along a radial direction of the through hole. An extending direction of the first rib is parallel to an axial direction of the central axis. The optical device is placed in the through hole, and the first rib interferes with the optical device so that the optical device is fixed in the through hole. The light source illuminates the optical device to form an illumination beam. The light valve is located on a transmission path of the illumination beam and is configured to convert the illumination beam into an image beam. The projection lens is located on a transmission path of the image beam and is configured to project the image beam.

Based on the above, in the fixing structure of the invention, by providing ribs at the inner wall, the optical device may be fixed in the through hole of the fixing structure without using other additional parts. Therefore, for the projection apparatus using this fixing structure, the parts for assembly may be reduced, and the assembly process may be simplified at the same time.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
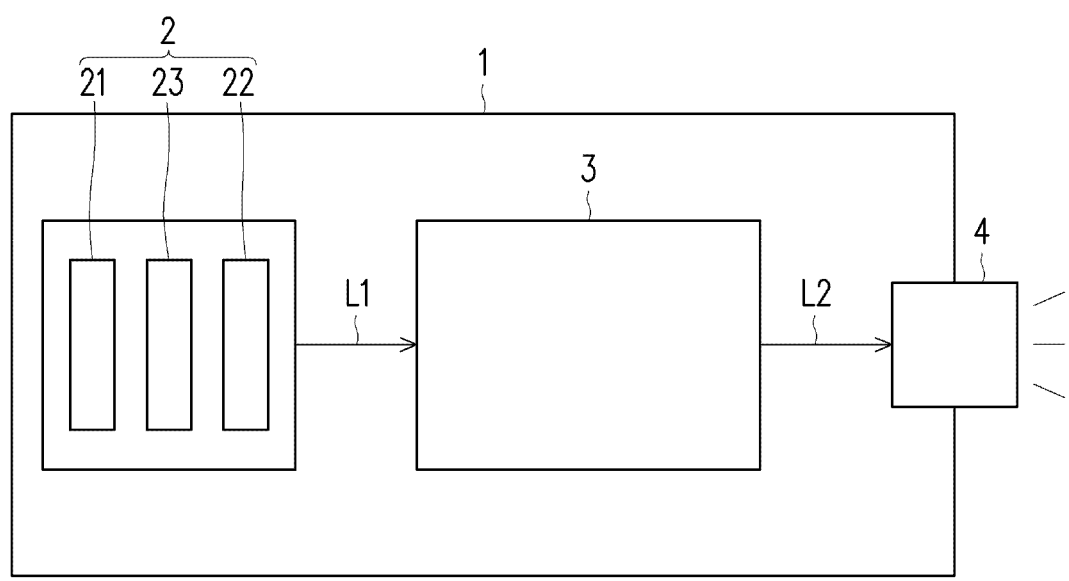
FIG. 1 is a schematic diagram of a projection apparatus of an embodiment of the invention.
Figure 2:
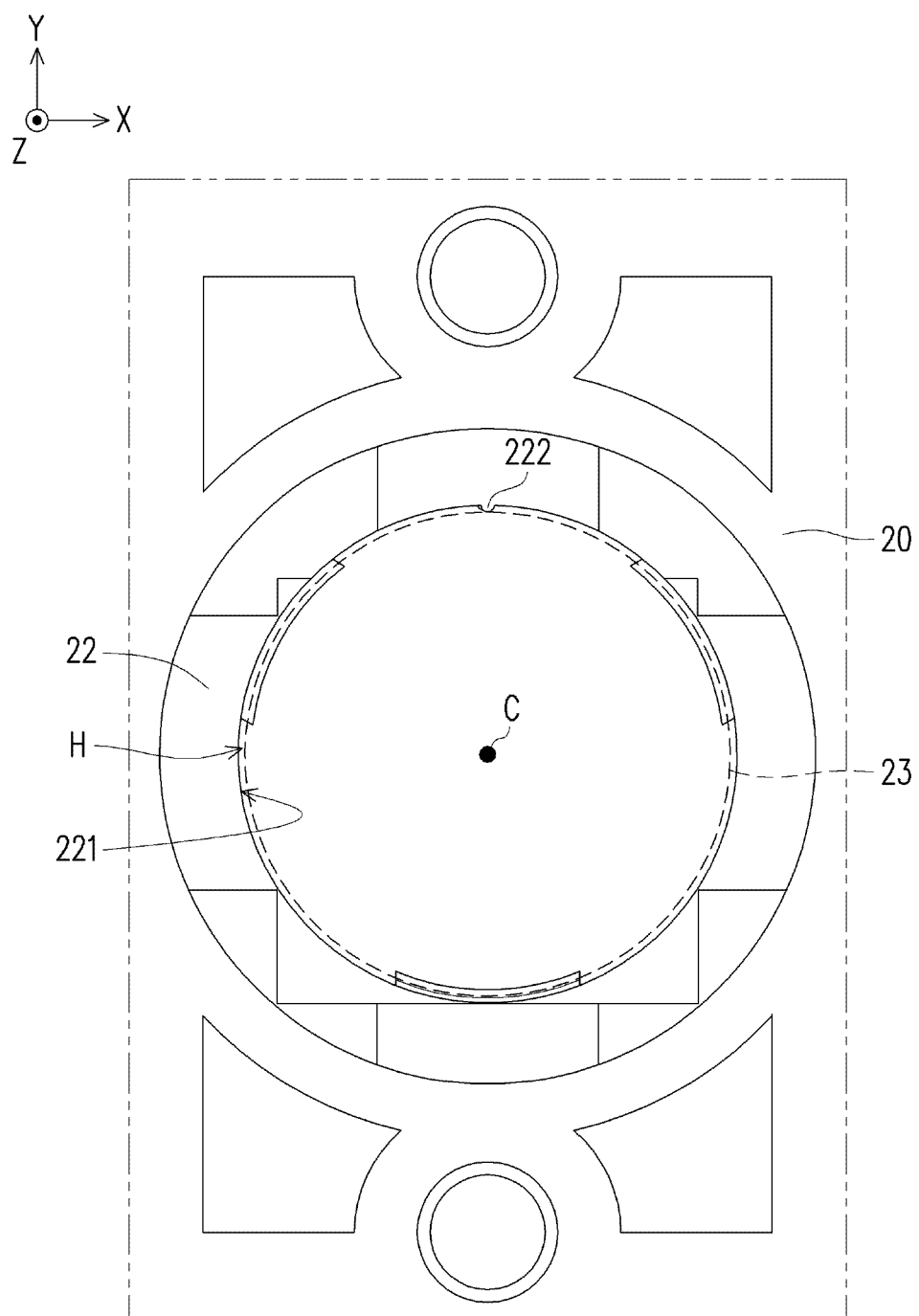
FIG. 2 is a partial schematic diagram of the fixing structure and the optical device in FIG. 1.
Figure 3:
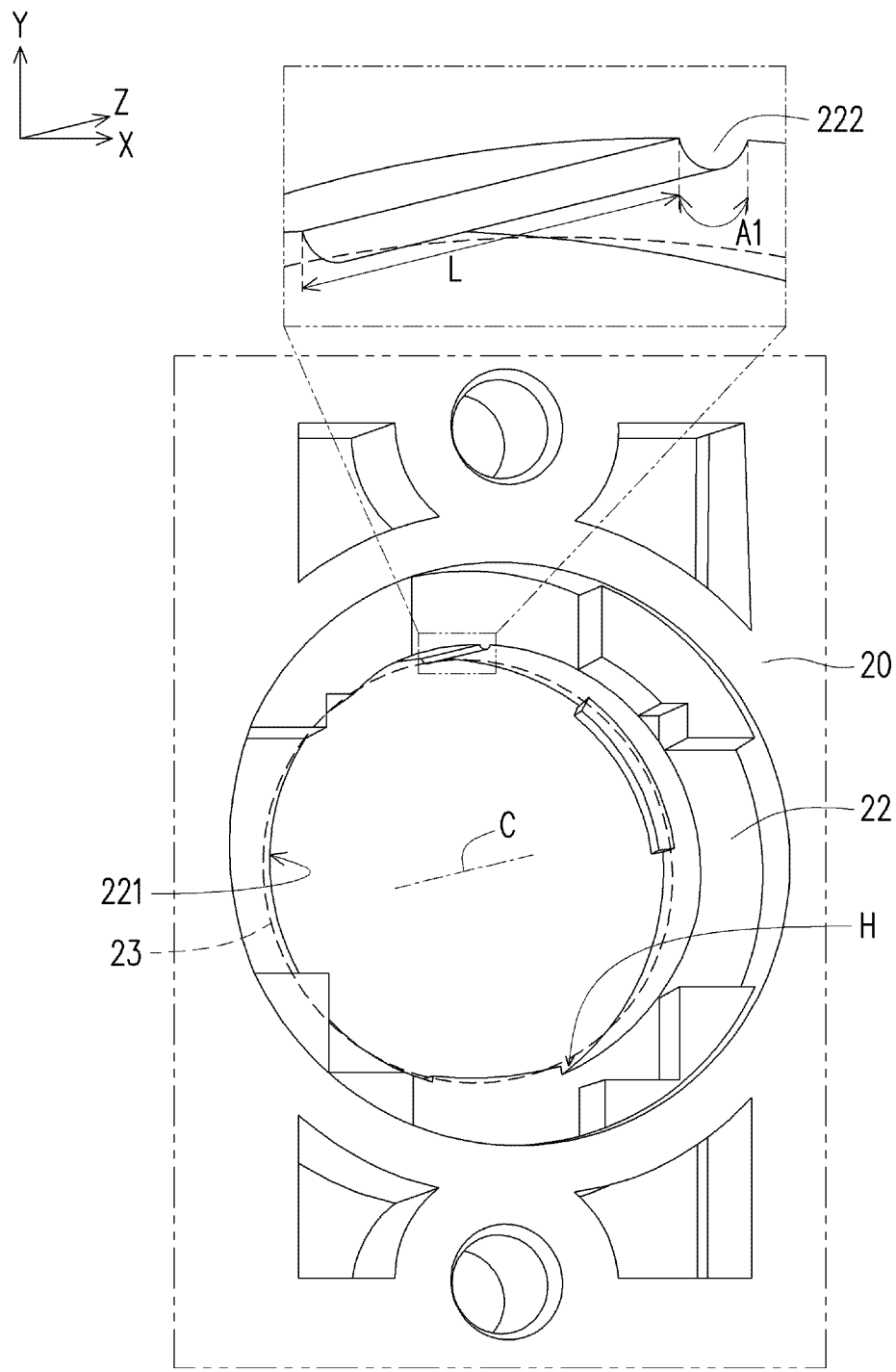
FIG. 3 is a partial schematic diagram of the fixing structure of FIG. 2 from different perspectives.

FIG. 1 is a schematic diagram of a projection apparatus of an embodiment of the invention. FIG. 2 is a partial schematic diagram of the fixing structure and the optical device in FIG. 1. FIG. 3 is a partial schematic diagram of the fixing structure of FIG. 2 from different perspectives. Please refer to FIG. 1, FIG. 2, and FIG. 3 at the same time.

A projection apparatus 1 of the invention includes an illumination system 2, a light valve 3, and a projection lens 4. The illumination system 2 is configured to provide an illumination beam L1. The light valve 3 is located on a transmission path of the illumination beam L1 and configured to convert the illumination beam L1 into an image beam L2. The projection lens 4 is located on the transmission path of the image beam L2 and configured to project the image beam L2 to display an image on a screen, a wall, or other projection targets. For example, the light valve 3 is, for example, a reflective light modulator such as a digital micro-mirror device (DMD) or a liquid crystal on silicon (LCoS) panel. In some embodiments, the light valve 3 may be, for example, a transmissive light modulator such as a liquid crystal display panel, an electro-optical modulator, a magneto-optic modulator, or an acousto-optic modulator (AOM). However, the content of the disclosure does not limit the configuration and type of the light valve 3. For example, the projection lens 4 includes a combination of one or a plurality of non-planar optical lenses with refractive power, such as various combinations including non-planar lenses such as biconcave lenses, biconvex lenses, concave-convex lenses, convex-concave lenses, plano-convex lenses, and plano-concave lenses. In an embodiment, the projection lens 4 may also include a flat optical lens to project the image beam L2 from the light valve 3 out of the projection apparatus 1 in a reflective or transmissive manner. The content of the disclosure does not limit the configuration and type of the projection lens 4.

The illumination system 2 includes a light source 21, a fixing structure 22, and an optical device 23. The fixing structure 22 and the optical device 23 are disposed between the light source 21 and the light valve 3. In detail, the projection apparatus 1 has a base 20 (as indicated in FIG. 2 and FIG. 3), and the fixing structure 22 is disposed at the base 20.

The fixing structure 22 has an inner wall 221 and a first rib 222. The inner wall 221 forms a through hole H around a central axis C, so that the central axis C is the central axis of the through hole H. The first rib 222 is disposed at the inner wall 221, wherein the first rib 222 is protruded from the inner wall 221 toward the central axis C along the radial direction of the through hole H, and the extending direction of the first rib 222 is parallel to the axial direction of the central axis C. Specifically, the height of the first rib 222 protruded from the inner wall 221 toward the central axis C along the radial direction of the through hole H is the thickness of the first rib 222, the distance that the first rib 222 is extended in an axial direction parallel to the central axis C is a length L of the first rib 222, and the size of the first rib 222 distributed along the circumferential direction of the through hole H is an arc length A1 of the first rib 222.

The optical device 23 is placed in the through hole H. The optical device 23 of the embodiment is a lens, and the light source 21 irradiates the optical device 23 to form the illumination beam L1. When the optical device 23 is placed in the through hole H, the first rib 222 located in the inner wall 221 interferes with the optical device 23 so that the optical device 23 is fixed in the through hole H.

In an embodiment, providing only one first rib 222 may achieve the object of interfering with the optical device 23 in the through hole H to fix the optical device 23 in the through hole H. In this case, before the optical device 23 is fixed in the through hole H, the optical axis of the optical device 23 is not overlapped with the central axis C of the through hole H. However, by disposing one first rib 222, the optical device 23 may be fixed at a position where the optical axis of the optical device 23 is overlapped with the central axis C of the through hole H, so as to achieve a good beam transmission effect.

Figure 4:
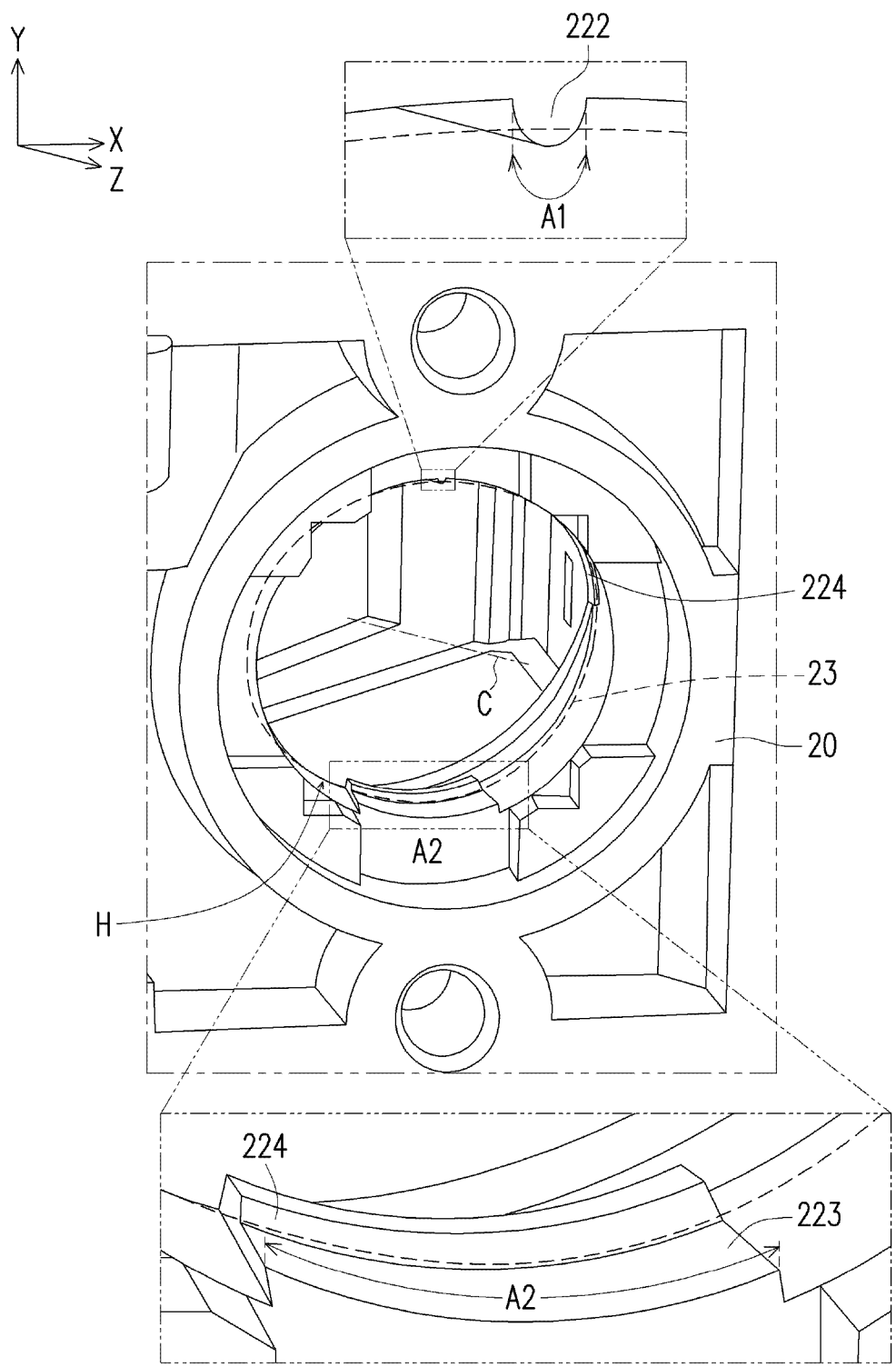
FIG. 4 is a partial schematic diagram of the fixing structure of FIG. 2 from another perspective.

FIG. 4 is a partial schematic diagram of the fixing structure of FIG. 2 from another perspective. Please refer to FIG. 2, FIG. 3, and FIG. 4 at the same time. It should be mentioned that, when only one first rib 222 is disposed, the fixing structure 22 may further have a positioning boss 223 disposed at the inner wall 221, wherein the positioning boss 223 is extended along the circumferential direction of the through hole H and protruded from the inner wall 221 toward the central axis C along the radial direction of the through hole H.

Furthermore, the positioning boss 223 and the first rib 222 are disposed at an equal angle around the central axis C. For example, in the embodiment shown in FIG. 4, the number of the first rib 222 is one, and the number of the positioning boss 223 is also one. In this case, the positioning boss 223 and the first rib 222 are disposed at an angle of 180 degrees. That is, with the central axis C as the center of the through hole H, the positioning boss 223 and the first rib 222 are located at two opposite sides of the central axis C in the radial direction of the through hole H. Since the first rib 222 and the positioning boss 223 are disposed at an angle of 180 degrees, the first rib 222 and the positioning boss 223 interfere with the optical device 23 at a symmetrical angle and with a more uniform force. In this way, the optical device 23 is not readily skewed and may be more stably fixed in the through hole H. In other embodiments, the number of the first rib 222 is one, but the number of the positioning boss 223 may be a plurality. Taking two positioning bosses 223 as an example, the condition that the positioning bosses 223 and the first rib 222 are disposed at an equal angle around the central axis C needs to be satisfied. One first rib 222 and two positioning bosses 223 may be disposed at an angle of 120 degrees (not shown in the figure) to provide a more uniform force to the optical device 23 so that the optical device 23 may be more stably fixed in the through hole H.

In view of the above, the height of the positioning boss 223 from the inner wall 221 toward the central axis C along the radial direction of the through hole H does not need to be too high, and may be slightly greater than, equal to, or slightly less than the thickness of the first rib 222. The height (thickness) of the first rib 222 and the positioning boss 223 from the inner wall 221 toward the central axis C along the radial direction of the through hole H may be changed adaptively according to the size of the lens. In addition, along the circumferential direction of the through hole H, an arc length A2 of the positioning boss 223 is greater than the arc length A1 of the first rib 222 to improve the stability of fixing the optical device 23 in the through hole H. In other embodiments, when the number of the positioning boss 223 is a plurality, the arc length A2 may be regarded as the total arc length A2 of the plurality of positioning bosses 223, and it is only necessary to make the total arc length A2 greater than the arc length A1 of the first rib 222. At this time, the arc length of a single positioning boss 223 does not necessarily need to be greater than the arc length A1 of the first rib 222. More specifically, the position and size of the first rib 222 and the positioning boss 223 should be set to fix the optical device 23 at a position where the optical axis of the optical device 23 is overlapped with the central axis C of the through hole H to achieve a good beam transmission effect.

It may be seen from the above that the first rib 222 and the positioning boss 223 interfere with the optical device 23 along the radial direction of the through hole H, thereby stably fixing the optical device 23 in the through hole H. In this way, there is no need to fix the optical device 23 using adhesive or locking, thus not only reducing the use of assembly parts (holder, cover, and screws), but also simplifying the assembly process. Moreover, since mechanical interference is used instead of an adhesion method, if there is an issue in assembly, rework may be done conveniently and simply without damaging the fixing structure 22 or the optical device 23.

Figure 5:
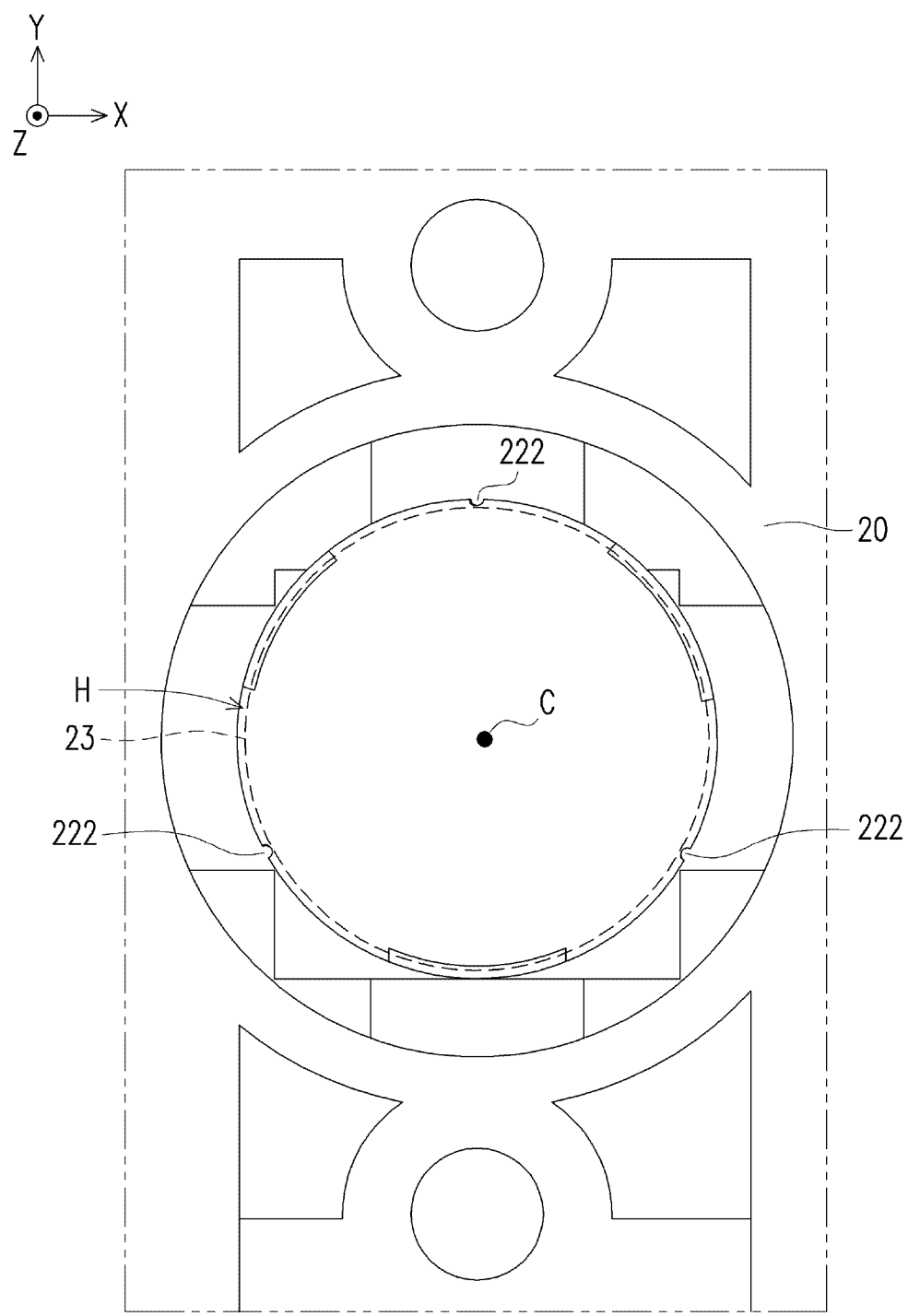
FIG. 5 is a partial schematic diagram of the fixing structure and the optical device of another embodiment of the invention.

FIG. 5 is a partial schematic diagram of the fixing structure and the optical device of another embodiment of the invention. In order to make the optical device 23 evenly stressed and more stably fixed in the through hole H, in the embodiment shown in FIG. 5, the number of the first rib 222 may also be set to a plurality (three first ribs 222 are exemplarily shown in FIG. 5), and the first ribs 222 are disposed at an equal angle around the central axis C. When the number of the first rib 222 is a plurality and the first ribs 222 are disposed at an equal angle around the central axis C, the positioning boss 223 may be omitted. Of course, when the number of the first rib 222 is a plurality, the positioning boss 223 may also be disposed according to requirements, and the positioning boss 223 and the first ribs 222 are staggered in the circumferential direction of the through hole H (not shown).

Figure 6:
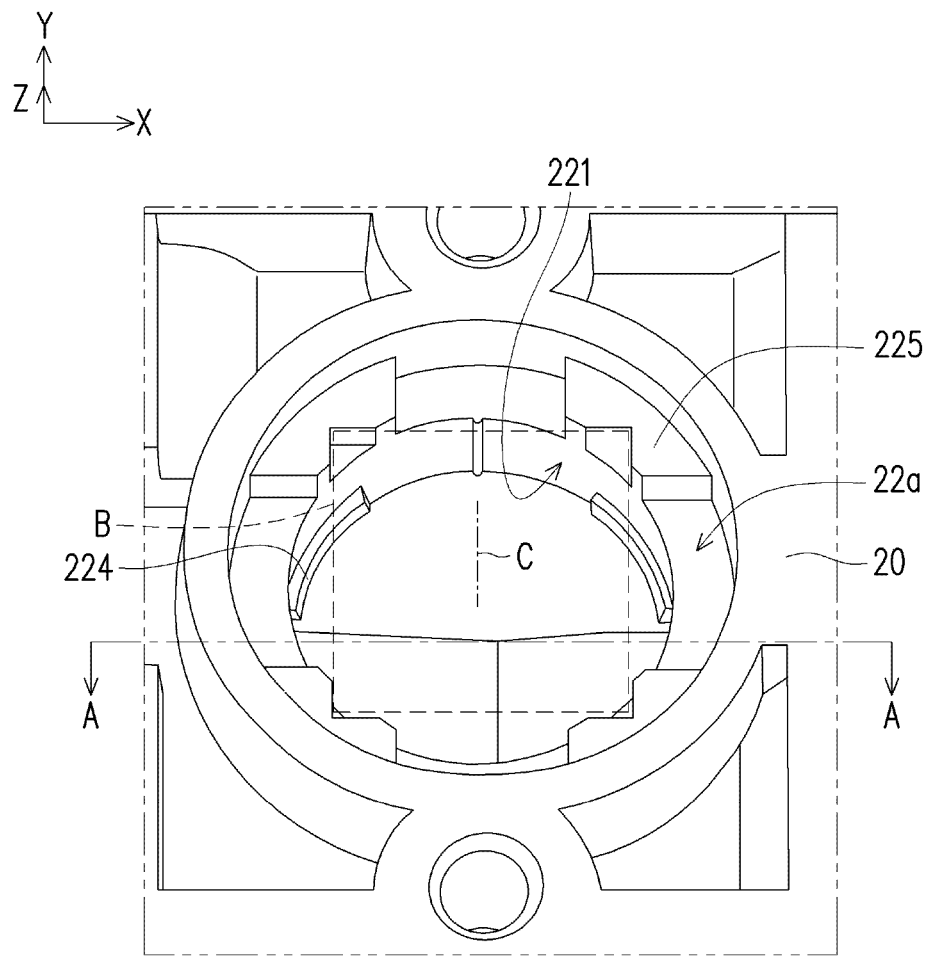
FIG. 6 is a partial schematic diagram of the fixing structure of FIG. 5 from another perspective.
Figure 7:
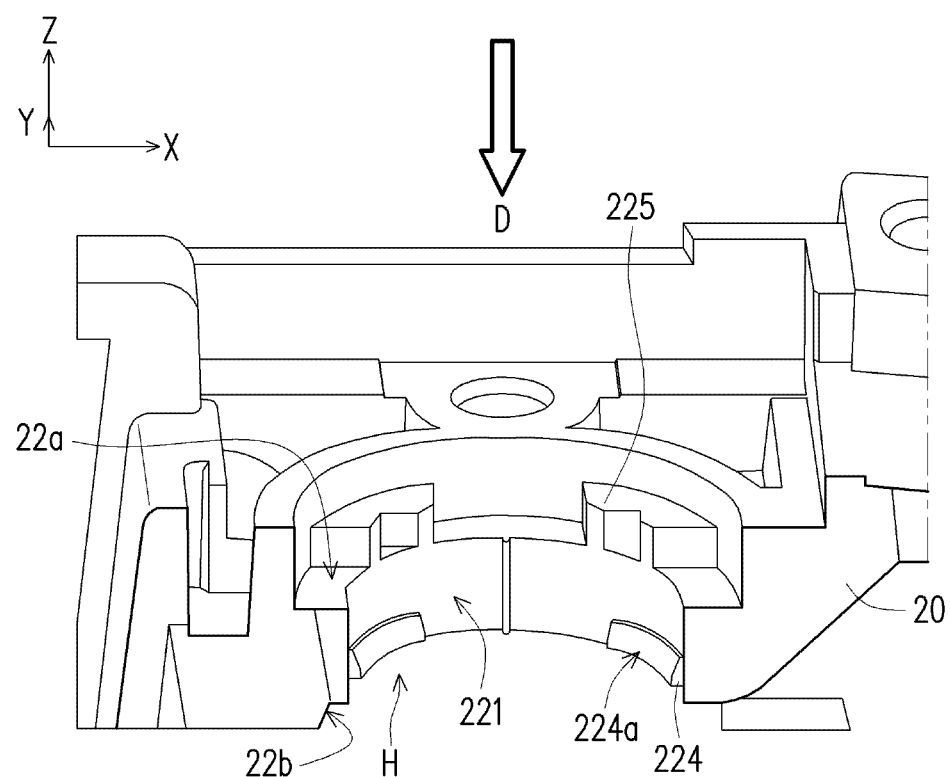
FIG. 7 is a schematic partial cross-sectional view along line A-A of FIG. 6.

FIG. 6 is a partial schematic diagram of the fixing structure of FIG. 5 from another perspective. FIG. 7 is a schematic partial cross-sectional view along line A-A of FIG. 6. It should be noted that, in order to clearly show the internal structure of the fixing structure, the optical device is omitted in FIG. 6 and FIG. 7. Referring to FIG. 6 and FIG. 7 at the same time, the fixing structure 22 further has a first surface 22a and a second surface 22b, wherein the inner wall 221 is connected between the first surface 22a and the second surface 22b. The optical device 23 is inserted into the through hole H along a direction D from the first surface 22a toward the second surface 22b. The fixing structure 22 further has a second rib 224, wherein the second rib 224 is also disposed at the inner wall 221. Different from the first rib 222, the second rib 224 is disposed to be extended along the circumferential direction of the through hole H and protruded from the inner wall 221 toward the central axis C along the radial direction of the through hole H to stop the optical device 23. More specifically, when the optical device 23 is assembled to the through hole H from the first surface 22a toward the second surface 22b, the arrangement of the second rib 224 may be used to limit the assembly distance of the optical device 23 to prevent the assembler from applying excessive force to cause the optical device 23 to fall off from the second surface 22b.

The number of the second rib 224 is a plurality, and the second ribs 224 are disposed at an equal angle around the central axis C. Disposing the plurality of second ribs 224 at an equal angle may prevent the optical device 23 from being skewed during mounting and positioning. In addition, the first ribs 222 and the second ribs 224 are angularly staggered around the central axis C. In other words, the first ribs 222 and the second ribs 224 are staggered in the circumferential direction of the through hole H. For example, the first ribs 222 are provided at 0 degrees, 120 degrees, and 240 degrees, and the second ribs 224 are provided at 60 degrees, 180 degrees, and 300 degrees. The advantage of this arrangement is that when the mold configured to form the first ribs 222 or the second ribs 224 needs to be repaired, the mold maintenance is more convenient.

In another embodiment, the second ribs 224 may also be provided as only one and formed around the entire inner wall 221 (not shown).

In the embodiment, a surface 224a of the second ribs 224 connected to the inner wall 221 may be an inclined surface inclined with respect to the inner wall 221. The inclined surface is configured to stop the curved portion of the edge of the optical device that is the lens.

However, in another embodiment, the surface 224a of the second ribs 224 connected to the inner wall 221 may be flat. The form in which the surface 224a of the second ribs 224 is connected to the inner wall 221 is not limited and may be adjusted according to requirements.

The positioning boss 223 and the second ribs 224 may be optionally provided according to requirements. Specifically, the positioning boss 223 may be omitted and the second ribs 224 are provided; or the positioning boss 223 may be provided and the second ribs 224 are omitted; or the positioning boss 223 and the second ribs 224 may be provided at the same time; or the positioning boss 223 and the second ribs 224 may be omitted, and only the first ribs 222 are provided. It should be noted that in the embodiment shown in FIG. 4, the fixing structure 22 also has the second ribs 224, wherein the positioning boss 223 and the second ribs 224 are provided at the same time, and the thickness of the second ribs 224 protruded from the inner wall 221 is greater than the thickness of the positioning boss 223 protruded from the inner wall 221. In addition, the positioning boss 223 may be connected to one of the second ribs 224, and in this case, the positioning boss 223 is extended from the first surface 22a to the second rib 224 along the axial direction of the central axis C.

In other embodiments, the positioning boss 223 and the second ribs 224 may be angularly staggered around the central axis C. That is, along the axial direction of the central axis C, the positioning boss 223 is not directly connected to any of the second ribs 224 (not shown).

Returning to FIG. 6 and FIG. 7, the fixing structure 22 further has a plurality of bosses 225, wherein the bosses 225 are disposed at the first surface 22a and disposed at an equal angle around the central axis C. During assembly, when the top of the fixture touches the first surface 22a, the automated assembly system knows that the positioning point for the assembly of the optical device 23 is reached.

Moreover, in the embodiment, the number of the bosses 225 is four, the four bosses 225 form a limiting area B, and the light source 21 (not shown) is correspondingly disposed in the limiting area B to emit light on the optical device 23.

When the assembler assembles the optical device 23 to the fixing structure 22, the optical device 23 is inserted into the through hole H along the direction D from the first surface 22a of the fixing structure 22 toward the second surface 22b of the fixing structure 22. At this time, the first ribs 222 interfere with the optical device 23, so the assembler applies force to push the optical device 23 to fix the optical device 23 in the through hole H. In addition, in some embodiments, the optical device 23 may be more stably fixed in the through hole H by the interference of the positioning boss 223 on the optical device 23.

The second ribs 224 may act as a stopper to limit the axial movement distance of the optical device 23 along the central axis C in the through hole H to prevent the optical device 23 from falling off from the second surface 22b due to excessive force by the assembler.

Incidentally, in order to achieve functions such as guiding light or improving resolution, the projection apparatus 1 may also include other optical apparatuses. The optical apparatuses may be selected according to actual needs.

Based on the above, the fixing structure of the invention and the projection apparatus using the fixing structure have the following advantages:

1. The invention uses interference to achieve the effect of assembling and fixing the optical device. Not only are the adhesive dispensing cost and adhesive dispensing man-hours required by the known fixing solution not needed, but the pollution of other parts caused by the colloid used in the known fixing solution may also be avoided. Therefore, the remaining parts may be kept clean. In addition, the issue of contaminating the optical device due to a colloid exerted by light irradiation may be avoided. Moreover, advantages such as simple and convenient rework without destructive influence on the optical device or the fixing structure and maintaining the integrity of the optical device and the fixing structure may also be achieved.

2. Compared with the known method of using screws to fix the optical device, screwless assembly of the optical device and the fixing structure in the invention may be achieved, thus reducing the use of parts and assembly man-hours, and may also achieve the effect of reducing accumulated tolerances. Moreover, it is only necessary to insert the optical device into the through hole formed by the inner wall of the fixing structure along the assembly direction, thus achieving the advantages of simple and convenient assembly method.

3. The volume of parts may be reduced, or related parts used to fix optical device may be reduced, thereby minimizing the volume of the projection apparatus.

4. The assembly of the optical device and the fixing structure in the invention may simplify the manufacturing process of assembling the lens, and therefore automatic assembly may be readily introduced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A fixing structure configured to fix a lens, wherein the fixing structure has an inner wall and a first rib, wherein:
   the inner wall forms a through hole around a central axis; and
   the first rib is disposed at the inner wall and protruded from the inner wall toward the central axis along a radial direction of the through hole, and an extending direction of the first rib is parallel to the central axis, wherein the lens is placed in the through hole, the first rib contacts with the lens so that the lens is fixed in the through hole.

2. The fixing structure of claim 1, wherein a number of the first rib is a plurality, and the first ribs are disposed at an equal angle around the central axis.

3. The fixing structure of claim 1, further comprising a first surface, a second surface, and a second rib, wherein the inner wall is connected between the first surface and the second surface, the lens is placed in the through hole along a direction from the first surface toward the second surface, the second rib is provided at the inner wall, and the second rib is extended along a circumferential direction of the through hole and protruded from the inner wall toward the central axis along the radial direction of the through hole to stop the lens.

4. The fixing structure of claim 3, wherein a number of the second rib is a plurality, and the second ribs are disposed at an equal angle around the central axis.

5. The fixing structure of claim 4, wherein a number of the first rib is a plurality, and the first ribs and the second ribs are angularly staggered around the central axis.

6. The fixing structure of claim 3, wherein the second rib has an inclined surface inclined with respect to the inner wall, and the inclined surface is connected to the inner wall.

7. The fixing structure of claim 3, further comprising a positioning boss disposed at the inner wall, wherein the positioning boss is extended along a circumferential direction of the through hole and protruded from the inner wall toward the central axis along the radial direction of the through hole, and a thickness of the second rib protruded from the inner wall is greater than a thickness of the positioning boss protruded from the inner wall.

8. The fixing structure of claim 1, further comprising a positioning boss disposed at the inner wall, wherein the positioning boss is extended along a circumferential direction of the through hole and protruded from the inner wall toward the central axis along the radial direction of the through hole, a number of the first rib is one, and the positioning boss and the first rib are disposed at an equal angle around the central axis.

9. The fixing structure of claim 8, wherein along the circumferential direction of the through hole, an arc length of the positioning boss is greater than an arc length of the first rib.

10. The fixing structure of claim 1, further comprising a first surface, a second surface, and a plurality of bosses, wherein the inner wall is connected between the first surface and the second surface, the lens is placed in the through hole along a direction from the first surface toward the second surface, the plurality of bosses are disposed at the first surface and disposed at an equal angle around the central axis, the plurality of bosses form a limiting area, and the light source is correspondingly disposed at the limiting area.

11. A projection apparatus, wherein the projection apparatus comprises an illumination system, a light valve, and a projection lens, wherein:
the illumination system is configured to provide an illumination beam, and the illumination system comprises a light source, a fixing structure, and a lens, wherein:
the fixing structure has an inner wall and a first rib, the inner wall forms a through hole around a central axis, the first rib is disposed at the inner wall, the first rib is protruded from the inner wall toward the central axis along a radial direction of the through hole, and an extending direction of the first rib is parallel to an axial direction of the central axis, and
the lens is placed in the through hole, and the first rib contacts with the lens so that the lens is fixed in the through hole, and the light source illuminates the lens to form the illumination beam;
the light valve is located on a transmission path of the illumination beam and configured to convert the illumination beam into an image beam; and
the projection lens is located on a transmission path of the image beam and configured to project the image beam.

12. The projection apparatus of claim 11, wherein a number of the first rib is a plurality, and the first ribs are disposed at an equal angle around the central axis.

13. The projection apparatus of claim 11, wherein the fixing structure further comprises a first surface, a second surface, and a second rib, the inner wall is connected between the first surface and the second surface, the lens is placed in the through hole along a direction from the first surface toward the second surface, and the second rib is extended along a circumferential direction of the through hole and protruded from the inner wall toward the central axis along the radial direction of the through hole to stop the lens.

14. The projection apparatus of claim 13, wherein a number of the second rib is a plurality, and the second ribs are disposed at an equal angle around the central axis.

15. The projection apparatus of claim 14, wherein a number of the first rib is a plurality, and the first ribs and the second ribs are angularly staggered around the central axis.

16. The projection apparatus of claim 13, wherein the second rib has an inclined surface inclined with respect to the inner wall, and the inclined surface is connected to the inner wall.

17. The projection apparatus of claim 13, wherein the fixing structure further comprises a positioning boss disposed at the inner wall, the positioning boss is extended along the circumferential direction of the through hole and protruded from the inner wall toward the central axis along the radial direction of the through hole, and a thickness of the second rib protruded from the inner wall is greater than a thickness of the positioning boss protruded from the inner wall.

18. The projection apparatus of claim 11, wherein the fixing structure further comprises a positioning boss disposed at the inner wall, the positioning boss is extended along a circumferential direction of the through hole and protruded from the inner wall toward the central axis along the radial direction of the through hole, a number of the first rib is one, and the positioning boss and the first rib are disposed at an equal angle around the central axis.

19. The projection apparatus of claim 18, wherein along the circumferential direction of the through hole, an arc length of the positioning boss is greater than an arc length of the first rib.

20. The projection apparatus of claim 11, wherein the fixing structure further comprises a first surface, a second surface, and a plurality of bosses, the inner wall is connected between the first surface and the second surface, the lens is placed in the through hole along a direction from the first surface toward the second surface, the plurality of bosses are disposed at the first surface and disposed at an equal angle around the central axis, the plurality of bosses form a limiting area, and the light source is correspondingly disposed at the limiting area.

* * * * *